United States Patent
Cichon et al.

[19]

[11] Patent Number: 5,669,530
[45] Date of Patent: Sep. 23, 1997

[54] MOUNTING SYSTEMS ACCOMODATING A MANUALLY ACTUATABLE PUMP FOR FIXED OR VARIABLE DOSE OPERATION

[75] Inventors: Ralph J. Cichon, Crystal Lake, Ill.; David G. Moore, Roach, Mo.; Peter J. Walters, Barrington, Ill.

[73] Assignee: AptarGroup, Inc., Crystal Lake, Ill.

[21] Appl. No.: 516,931

[22] Filed: Aug. 18, 1995

[51] Int. Cl.⁶ ............................................. G01F 11/00
[52] U.S. Cl. ............... 222/153.09; 222/309; 222/321.9
[58] Field of Search ..................... 222/153.05, 153.09, 222/309, 321.7, 321.8, 321.9

[56] References Cited

U.S. PATENT DOCUMENTS

| | | | |
|---|---|---|---|
| 1,362,077 | 12/1920 | Bobrick . | |
| 2,534,504 | 12/1950 | Engstrom | 222/383 |
| 2,861,839 | 11/1958 | Mellon | 299/97 |
| 2,987,223 | 6/1961 | Armour | 222/207 |
| 3,129,854 | 4/1964 | Boehm et al. | 222/383 |
| 3,157,323 | 11/1964 | Kitterman | 222/520 |
| 3,170,633 | 2/1965 | Castelli | 239/327 |
| 3,185,352 | 5/1965 | Ghisolfi | 222/193 |
| 3,827,606 | 8/1974 | Knickerbocker | 222/384 |
| 4,081,111 | 3/1978 | Sandow | 222/309 |
| 4,433,799 | 2/1984 | Corsette | 222/309 |
| 4,434,915 | 3/1984 | Kirk, Jr. | 222/321.9 X |
| 4,454,964 | 6/1984 | Sacher | 222/43 |
| 4,454,965 | 6/1984 | Kirk, Jr. | 222/153 |
| 4,603,794 | 8/1986 | DeFord et al. | 222/202 |
| 4,838,459 | 6/1989 | Nitta | 222/136 |
| 4,871,092 | 10/1989 | Maerte | 222/153 |
| 4,899,913 | 2/1990 | Ruscitti et al. | 222/385 |
| 4,911,314 | 3/1990 | Schneider | 215/228 |
| 4,971,226 | 11/1990 | Donoghue | 222/207 |
| 4,983,061 | 1/1991 | Demarest | 401/148 |
| 5,016,780 | 5/1991 | Moretti | 222/309 X |
| 5,026,193 | 6/1991 | Lucas | 401/219 |
| 5,031,800 | 7/1991 | Brunet | 222/153 |
| 5,046,645 | 9/1991 | Hagan et al. | 222/394 |
| 5,105,993 | 4/1992 | La Haye et al. | 222/189 |
| 5,271,532 | 12/1993 | Jumel et al. | 222/321 |
| 5,337,926 | 8/1994 | Drobish et al. | 222/309 |
| 5,377,881 | 1/1995 | Jouillat | 222/321 |
| 5,411,181 | 5/1995 | Knickerbocker | 222/309 |
| 5,445,299 | 8/1995 | Harriman | 222/321.9 X |

FOREIGN PATENT DOCUMENTS

| | | | |
|---|---|---|---|
| 942161 | 4/1956 | Germany | 222/309 |

OTHER PUBLICATIONS

International Search Report dated Oct. 10, 1996 for the International Patent Application Serial No. PCT/US96/13128.

*Primary Examiner*—Joseph Kaufman
*Attorney, Agent, or Firm*—Dressler, Rockey, Milnamow & Katz, Ltd.

[57] ABSTRACT

A system is provided for securing together a container having an opening and a finger-operable pump. One form of the system includes a mounting flange on the pump and a support structure in the container for receiving the flange in a snap-fit or press-fit engagement. In another form, the pump mounting flange is heat bonded to the container with a liner that includes at least two layers of a heat-weldable plastic around at least one interposed layer of substantially electrically conductive metal which can be heated with induction heating. The container can be threaded, and a threaded collar can be screwed onto the container. The collar can have an abutment surface for facing the pump actuator, and the collar can be screwed up or down on the container to establish a selected distance between the collar abutment surface and the pump actuator so as to define the stroke length of the pump.

30 Claims, 10 Drawing Sheets

5,669,530

MOUNTING SYSTEMS ACCOMODATING A MANUALLY ACTUATABLE PUMP FOR FIXED OR VARIABLE DOSE OPERATION

TECHNICAL FIELD

This invention relates to a system for mounting a finger-operable pump in the top of a container.

BACKGROUND OF THE INVENTION AND TECHNICAL PROBLEMS POSED BY THE PRIOR ART

Finger-operable dispensing pumps are typically adapted to be mounted on hand-held containers. Such containers are commonly used for liquid or paste products, such as household and automotive cleaners, industrial preparations, and personal care products such as hairsprays, deodorants, colognes, and the like. Typically, some pumps operate to produce a fine mist or atomized spray, and other pumps operate to dispense a quantity of product in a liquid or paste form.

Finger-operable pumps conventionally employ a pump chamber in which is disposed a pressurizing piston that can be actuated by pressing down on an external actuator button or plunger which is connected to the piston with a hollow stem. The hollow stem establishes communication between the pump chamber and actuator button from which the product is discharged. A spring acts against the piston or actuator button to return the piston and actuator button upwardly to the elevated rest position when the finger pressure is released.

A variety of systems are in use or have been proposed for securing together the container and the finger-operable pump. There is, however, a need for an improved system which will readily accommodate the incorporation of certain desirable features.

In particular, it would be advantageous to provide an improved system for mounting the pump in the container with a secure engagement that accommodates ease of assembly.

Further, it would be desirable to provide a mounting system that accommodates selective variation of adjustment of the dose or output from the pump.

It would also be beneficial if such an improved system could accommodate the secure mounting of a pump for fixed or variable dose operation wherein a tamper-evident feature is provided to indicate the removal of the pump from its original container.

It would also be advantageous if an improved mounting system could be adapted in certain applications to mount the pump to the container without requiring an additional closure collar and plastic sealing liner which are employed in most conventional designs to clamp the pump to the container in a leak-tight manner.

It would also be desirable to provide a pump mounting system which can be assembled and installed with existing, conventional pump placement equipment and assembly equipment.

Further, such an improved system should include design features that can be readily incorporated in the system components so as to facilitate economical manufacture, high production quality, and consistent operating parameters unit-to-unit with high reliability.

The present invention provides an improved system which can accommodate designs having the above-discussed benefits and features.

SUMMARY OF THE INVENTION

The present invention provides a system for securing together a container and a finger-operable pump. In one form of the invention, the pump is mounted to the container in a force-fit or snap-fit engagement which eliminates the need to clamp the pump to the container with a closure collar and plastic liner.

According to another aspect of the invention, the mounting system accommodates a selective setting of the components so as to provide a desired quantity or dose of the product to be dispensed with each pump stroke. With products that are atomized during the dispensing process, such a change in the amount of product dispensed per pump stroke can result in a desired change in the spray pattern. This can be advantageous in a variety of applications. For example, with hairspray it may be desirable to have the capability for spraying a relatively large area or for optionally spraying a relatively small area.

In another form of the system of the present invention, the pump is mounted to the container in a way that is tamper-resistant and tamper-evident. An attempt to remove the pump from the container tears or damages a heat-welded material which provides evidence of removal or tampering. With the tamper-resistant form of the system, the pump can be secured to the container without requiring the use of a separate closure or collar to clamp the pump to the container. However, if desired, an adjusting collar can be provided to vary the pump stroke length, and hence, dose.

One form of the system employs a unique snap-fit engagement of the container and pump. In particular, the pump includes a peripheral mounting flange which has a flat top surface, a flat bottom surface, and a cylindrical side surface. A pump support structure is defined by the container around the container opening for supporting the pump flange. The support structure includes an annular recess defined by a cylindrical wall adjacent the pump flange cylindrical side surface. The support structure in the container also includes an annular bead having an upwardly convex surface for engaging and supporting the flat bottom surface of the pump flange. The support structure also includes a snap-fit lip engaging the flat top surface of the pump flange to retain the pump flange in a snap-fit engagement so that the pump projects from the container.

According to another aspect of the invention, a system is provided for securing together a container having opening and a finger-operable pump wherein the stroke length can be adjusted. The pump has (1) a body, (2) a hollow stem extending from, and in fluid communication with the interior of, the body for reciprocation relative to the body, and (3) an actuator on, and in fluid communication with, the stem from which product can be dispensed.

The system comprises a peripheral mounting flange extending from the pump body. A pump support surface is defined by the container around the opening for supporting the pump body flange. A retention means is provided for holding the pump body flange on a support surface. The retention means can be (1) the above-described snap-fit structure, (2) some other type of snap-fit structure, (3) a press fit, (4) a heat weld or bonding of the components, (5) an adhesive bonding of the components, or (6) other retention system. The pump is retained on the container so that the stem and actuator project from the container.

A thread is defined by the container around the container opening. A collar is rotatably mounted on the container. The collar defines a thread engaged with the container thread. The collar has an abutment surface facing the actuator. The collar can be rotated on the container to establish a selected distance between the collar abutment surface and the actuator. This defines the stroke length of the pump.

According to another aspect of the invention, a system is provided for securing a finger-operable pump in an opening of a container defining a support surface. The system includes a peripheral mounting flange extending from the pump. A liner is provided with at least two layers of heat-weldable plastic around at least one interposed layer of a substantially electrically conductive metal. The liner can be disposed between the pump flange and the container support surface while induction heating and subsequent cooling of the liner bonds the pump flange to the container support surface.

According to another aspect of the invention, the bonded liner provides tamper resistance and provides a tamper-evident feature. The heat-bonded mounting of the pump resists attempts to pull the pump out of the container. However, if the pump is pulled out of the container, the liner tears or is otherwise damaged to provide evidence of removal or tampering.

According to another aspect of the invention, a collar may be optionally provided with the above-described bonded liner assembly of the container and pump. The collar can be threadingly engaged with the container and can include an abutment surface facing the pump actuator. Thus, rotation of the collar on the container will establish a selected distance between the collar abutment surface and the pump actuator which defines the stroke length of the pump.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENTS

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the pumps and containers employed with this invention are described in the normal (upright) operating position, and terms such as upper, lower, horizontal, etc., are used with reference to this position. It will be understood, however, that the pumps and components embodying this invention may be manufactured, stored, transported, used, and sold in an orientation other than the position described.

Figures illustrating the pumps and containers show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

Figure 1:
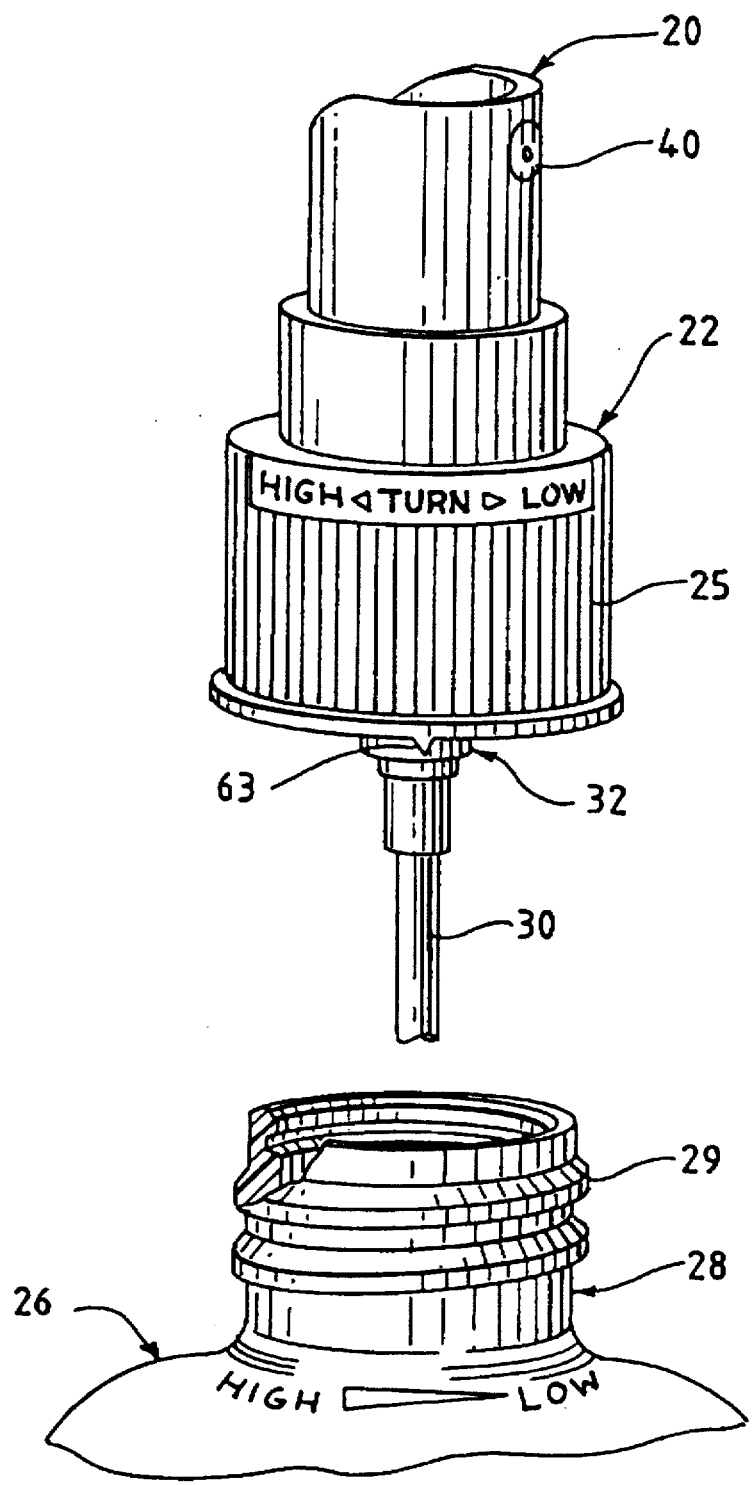
FIG. 1 is a fragmentary, exploded, perspective view, partly in cross section, of a first embodiment of a system of the present invention for securing together a container and finger-operable pump.

With reference to FIG. 1, a pump used with the system embodying the present invention is designated generally by the reference numeral 20. The pump 20 is disposed within a closure, cup, cap, or collar 22 which includes a skirt 25 having threads 24 (FIG. 2) for attaching the collar 22 to the open top of a container 26.

The container 26 is adapted to hold a liquid or paste product (not visible below the pump 20 in the container 26 illustrated in FIG. 1). Typically, the container 26 can be conveniently held in the user's hand.

The container 26 may be made of any suitable material, such as metal, glass, or plastic. A vacuum take-up piston (not illustrated) could be provided in the bottom of the container 26 if desired to assist in the dispensing of a paste-like product. The container can have a reduced diameter neck 28 defining a mouth or opening into which the pump 20 is inserted. The container neck 28 has external threads 29 for engaging the collar threads 24.

For dispensing a liquid product as a liquid discharge or spray, a conventional suction tube or dip tube 30 is provided. The liquid in the container 26 is drawn up into the pump 20 through the suction tube or dip tube 30 which is connected by suitable conventional means to the bottom of the pump 20. The suction tube 30 extends to near the bottom of the container 26. The bottom end of the suction tube 30 is normally submerged in the liquid when the container 26 is in a generally upright orientation as illustrated in FIG. 1.

Figure 2:
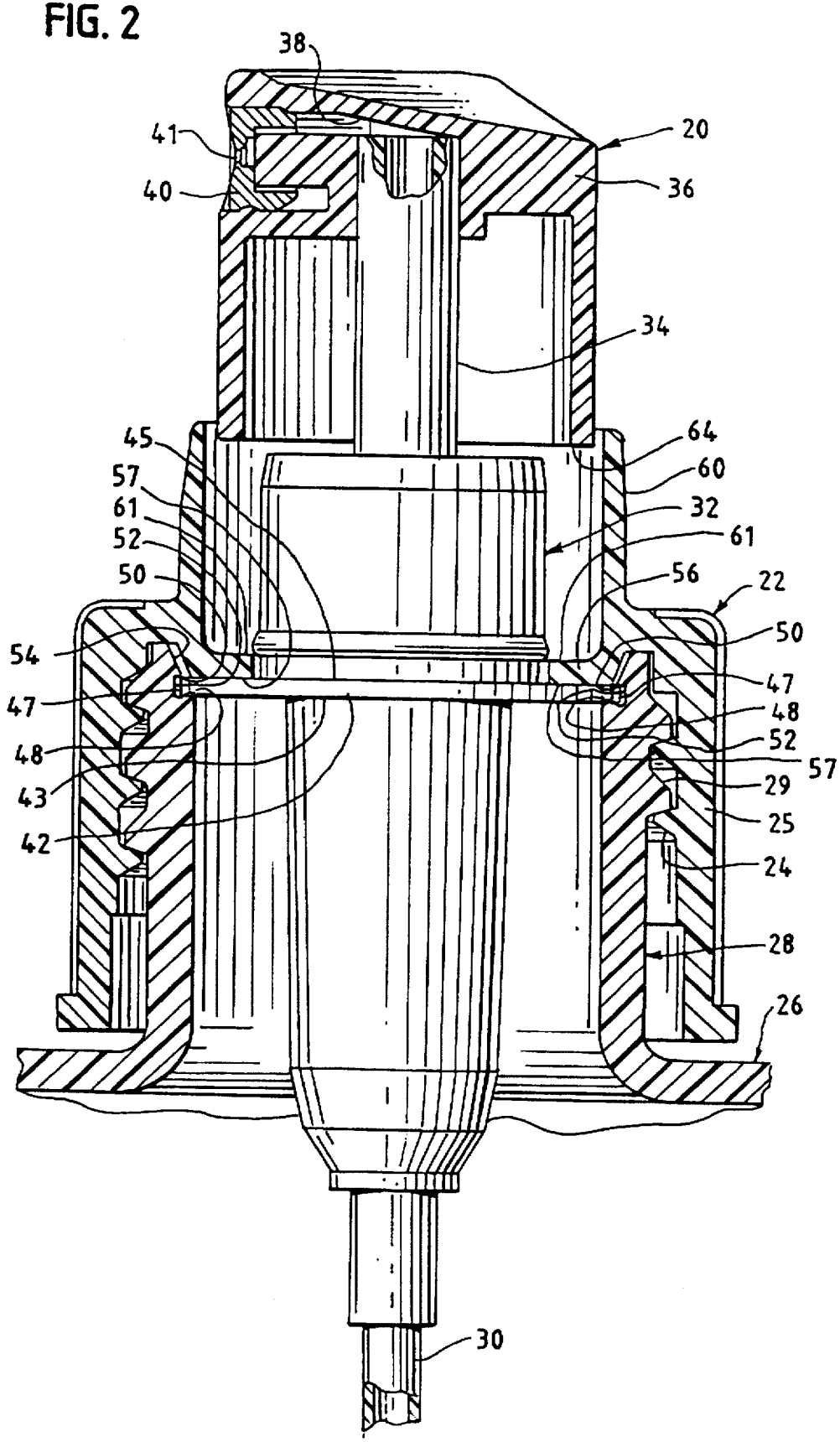
FIG. 2 is a greatly enlarged, fragmentary, cross-sectional view of the assembled components shown in FIG. 1.

The pump 20 includes a pump body 32 extending into the container opening. The bottom end of the body 32 is attached to the suction tube 30, and the upper end of the body 32 projects out of the container neck 28 (FIG. 2). The pump body 32 defines an interior chamber (not visible) in which is disposed a pressurizing piston (not visible). The pressurizing piston is connected to a hollow stem 34 which extends out through the top of the pump body 32. The hollow stem 34 establishes communication between the pump chamber within the pump body 32 and an actuator button 36 mounted to the upper end of the stem 34.

The actuator button 36 defines a discharge cavity 38 through which the product from the stem 34 is discharged. The discharge cavity 38 communicates with a conventional spray insert nozzle 40 through suitable discharge passages, and the product exits as a fine mist spray from an orifice 41 in the nozzle.

Figure 3:
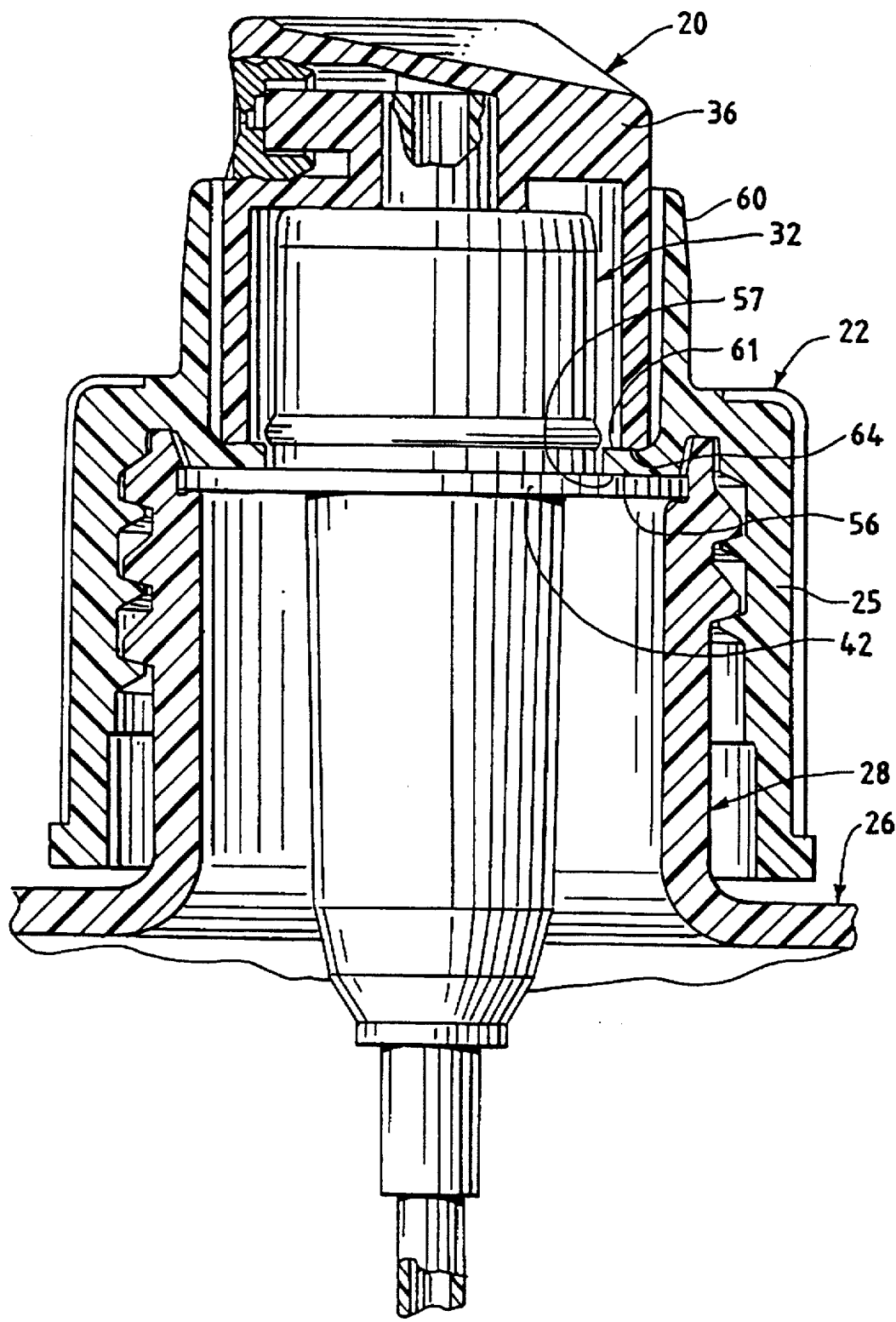
FIG. 3 is a view similar to FIG. 2, but with the components in an actuated, full stroke condition.

A spring (not visible in the figures) acts against the piston or stem 34 inside the pump body to bias the piston, stem 34, and actuator button 36 upwardly to the elevated rest position when finger pressure is released (as illustrated in FIG. 2). When the actuator button 36 is depressed, as illustrated in FIG. 3, product is dispensed from the pump 20.

The pump 20 (including the pump body 32, stem 34, and actuator 36 (which includes the spray insert nozzle 40)) may be of any suitable conventional or special design with respect to the internal components and operation described above. While the present invention may be practiced with pumps of many different designs, one particularly suitable pump is generally disclosed in U.S. Pat. No. 4,986,453, the disclosure of which is hereby incorporated herein by reference thereto. It should be understood, however, that the present invention is suitable for use with a variety of finger-operable pumps.

According to the mounting system of the present invention, a peripheral mounting flange 42 is provided on the exterior of the pump body 32. As shown in FIG. 2, the pump body flange 42 has a lower surface 43, an upper surface 45, and a cylindrical side surface 47 between the upper surface 45 and lower surface 43. The pump body flange 42 is received in a pump support structure defined by the container neck 28 around a container opening. In particular, the container neck 28 has the form of an annular wall defining the opening to the container 26, and the interior of the annular wall of the neck 28 defines a pump support structure around the opening.

The support structure in the container neck 28 for the pump flange 42 includes a support surface 48. The surface 48 has a configuration of an annular, convex bead which may be further characterized as defining a convex shoulder recessed inwardly from the distal end of the container neck 28. Located outwardly from (above) the support surface 48 is a lip 50 defined by the container neck 28. The container neck 28 also defines a generally cylindrical recess 52 between the support surface 48 and the lip 50. Between the distal end of the container neck 28 and the lip 50, the container neck 28 defines a frustoconical lead-in surface 54.

The pump body flange 42 is adapted to be received in the container neck recess 52 in a snap-fit engagement between the support surface 48 and the lip 50. To this end, during initial assembly, the pump flange 42 can be forced against the container neck frustoconical lead-in surface 54. Owing to the inherent resiliency of the container neck structure at the distal end of the container, the neck 28 diameter increases slightly when subjected to the radially outwardly acting force of the inserted body flange 42. The flange 42 is thus able to move inwardly beyond the expanded lip 50 and against the support surface 48. Thereafter, the container neck diameter returns to the original diameter owing to the inherent resiliency of the container material, and a snap-fit engagement of the pump body flange 42 is obtained.

The snap-fit retention of the pump body within the container neck 28 provides a strong system securing together the container 26 and the pump 20. The mounting of the pump 20 in this manner is sufficiently strong to eliminate the requirement for the use of any additional clamping closure, cup, or collar to retain the pump in the manner employed in many other conventional pump attachment systems.

Although the collar 22 is not required for retaining the pump 20 in the container 26, the collar 22 has other functions. One function of the collar 22 is to serve as an aid during assembly for forcing the pump flange 42 into the container neck recess 52. To this end, the collar 22 includes a radially inwardly extending flange 56. The collar flange 56 has a lower surface 57 which is adapted to engage the upper surface 45 of the pump flange 42. During assembly, the pump 20 and collar 22 can be placed over the container opening, and the collar 22 can be threadingly engaged with the container neck 28 so as to drive the pump flange 42 into the snap-fit engagement with the container neck 28.

The collar 22 may also function as an aesthetically pleasing housing around the upper portion of the pump body 32 that projects out of the container neck 28. To this end, the collar 22 includes an annular wall 60 projecting upwardly toward the actuator button 36. The annular wall 60 has an interior diameter large enough to accommodate reciprocation of the actuator button 36 within the annular wall 60 (as can be seen in FIG. 3).

It is desirable in some applications to have the capability for varying the amount of product to be discharged or dispensed from the pump 20. To this end, a system is provided for adjusting the length of the stroke of the pump 20. The collar 22 also functions to provide such a stroke length adjustment for the pump 20. In particular, the radially inwardly extending flange 56 on the collar 22 has an upwardly facing surface 61 adapted to function as an abutment surface for engaging the bottom of the actuator button 36 and limiting the downward movement of the button 36. The button 36 has a downwardly facing engaging surface 64 which is adapted to engage the abutment surface 61 on the top of the collar flange 56 (FIG. 3).

When the collar 22 is threadingly engaged fully on the container neck 28 as illustrated in FIG. 3, the collar flange 56 is at the lowest possible position so as to accommodate depression of the actuator button 36 to its lowest possible position. This corresponds to the maximum or full stroke length of the pump 20. This provides the maximum dose or maximum dispensing quantity. In FIG. 3, the actuator button bottom surface 64 is shown just touching the collar flange upper surface 61. However, it may be preferred in the maximum stroke condition that the button 36 not engage the collar flange 56. The downward motion of the pump stem 34 would be limited by the engagement of the other components (not illustrated) within the pump body 32. Thus, at the bottom of the pump stroke, there would be a slight clearance between the top of the collar flange 56 and the button 36. During assembly, when the button 36 is pushed onto the stem 34, the clearance would ensure that the button 36 can be fully inserted onto the stem 34.

Figure 4:
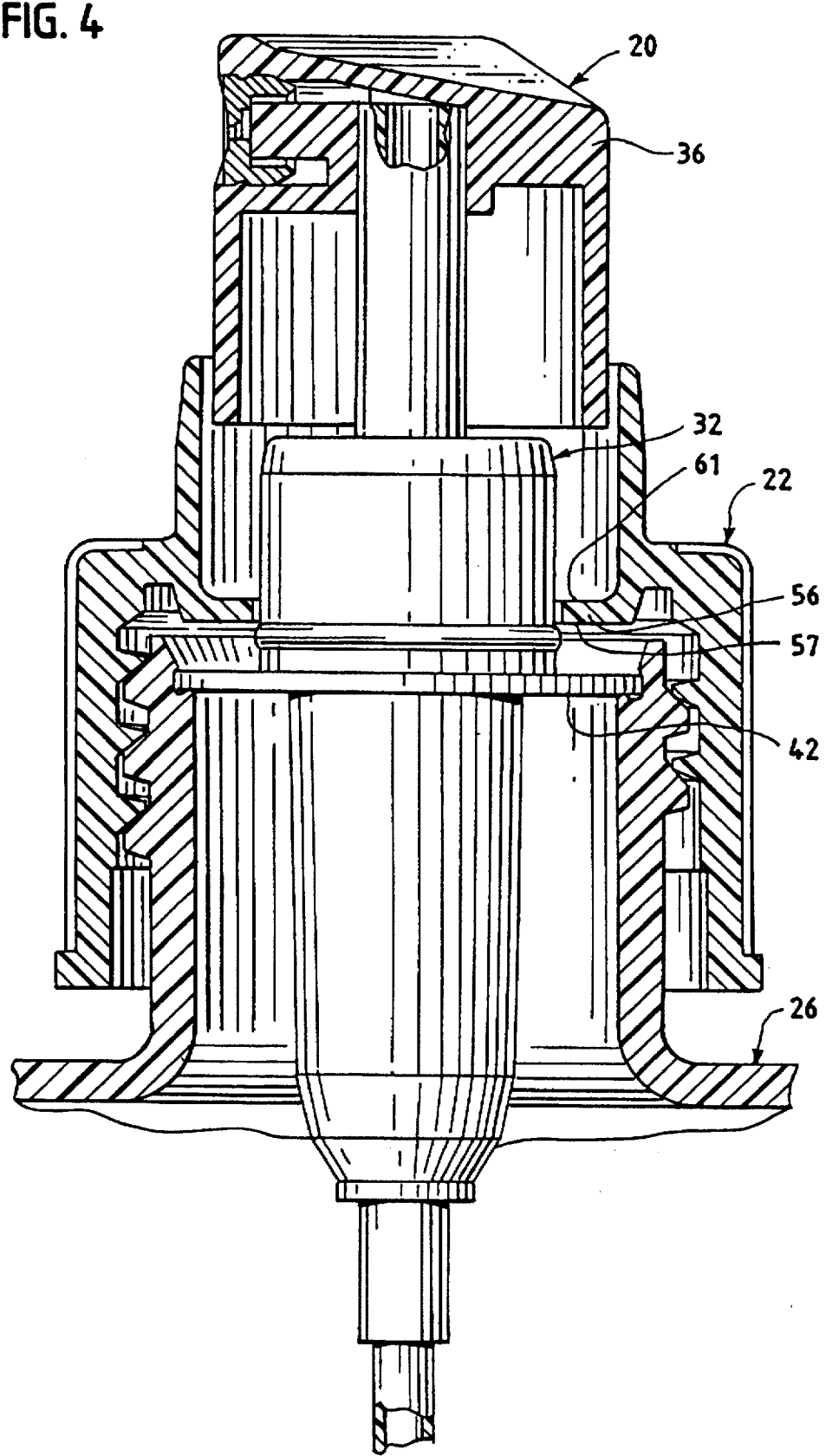
FIG. 4 is a view similar to FIG. 2, but FIG. 4 shows the collar at a selected, raised elevation on the container.
Figure 5:
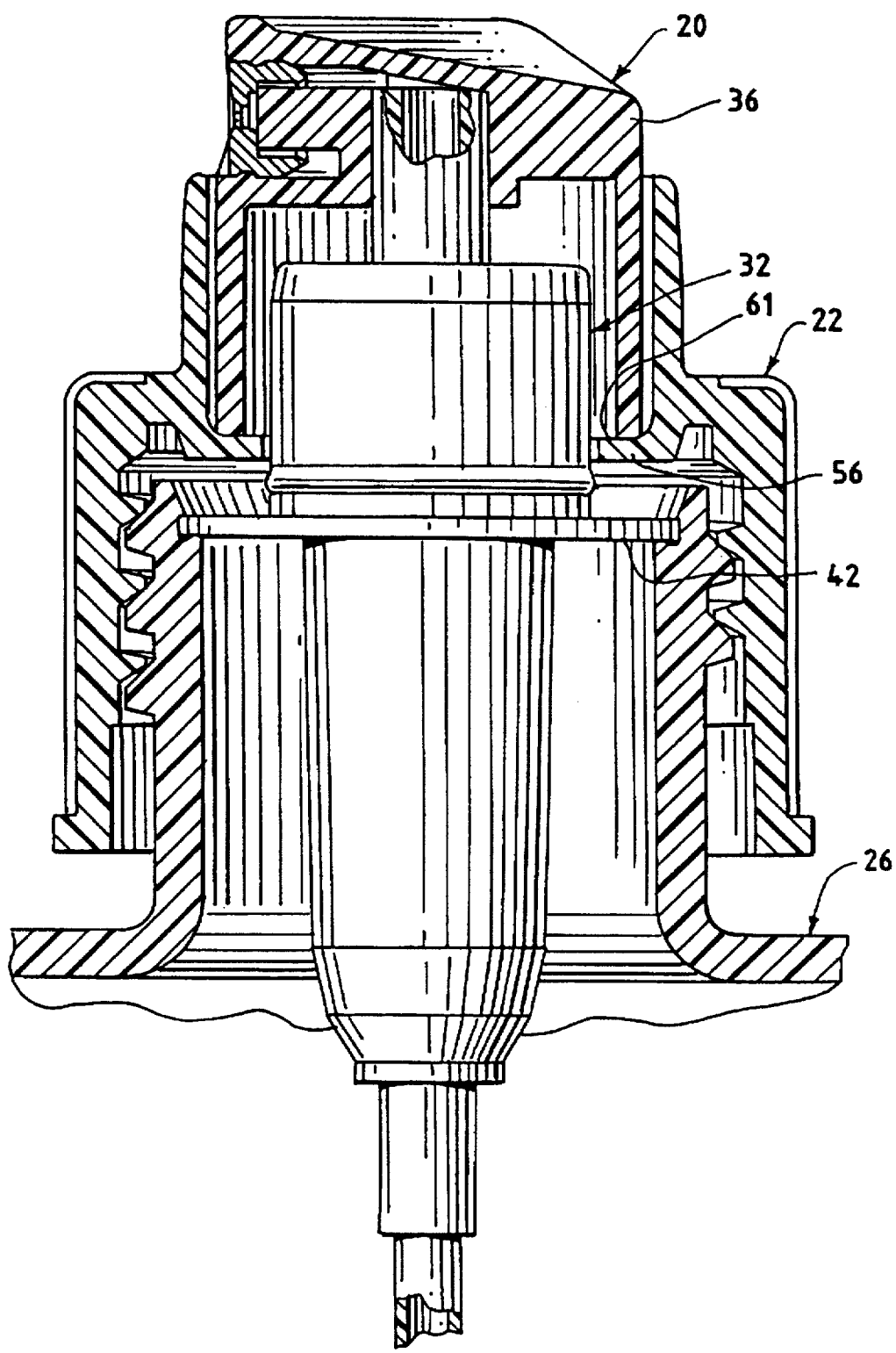
FIG. 5 is a view similar to FIG. 4, but FIG. 5 shows the actuator button depressed to engage the collar at the bottom end of a shortened stroke.

The dose per pump stroke can be decreased by limiting the downward movement of the actuator button 36. To this end, the collar 22 can be screwed upwardly relative to the container neck 28 to a selected position, such as the position illustrated in FIG. 4. In FIG. 4, the collar flange 56 is spaced upwardly away from the pump flange 42. The selected elevation of the collar flange 56 determines the limit of the downward travel of the actuator button 36. As illustrated in FIG. 5, when the actuator button 36 is subsequently depressed, the downward movement of the actuator button 36 terminates after a shorter stroke length when the bottom of the actuator button 36 engages the flange 56. This results in the dispensing of a lesser quantity of product (i.e., a smaller dose).

If desired, indicia may be provided to assist in guiding the user in operation of the adjustment collar 22. In particular, the container 26 may include the words "HIGH" and "LOW" below the neck 28 as illustrated in FIG. 1. Further, an arrowhead may be provided on the container 26 between the two words "HIGH" and "LOW" with the wider base of the arrowhead adjacent the word "HIGH" and with the pointed end of the arrowhead adjacent the word "LOW."

The collar 22 can include a downwardly projecting pointer 63 as shown in FIG. 1. Rotation of the collar 22 to locate the pointer 63 over (or beyond) the word "HIGH" on the container 26 moves the collar to a lower position on the neck 28, and this provides a longer pump stroke length, and hence a greater dose or dispensing quantity per pump stroke.

Conversely, the adjustment collar 22 can be rotated in the other direction to locate the pointer 63 over (or beyond) the word "LOW" on the container 26. This causes the collar 22 to move upwardly on the container neck 28 to shorten the pump stroke length for decreasing the dose per pump stroke.

The adjustment collar 22 may also include the words "HIGH," "TURN," and "LOW" as shown in FIG. 1. As illustrated in FIG. 1, an arrowhead can be provided on either side of the word "TURN" with one arrowhead pointing toward the word "HIGH" and with the other arrowhead pointing toward the word "LOW." This makes it clear to the user that the adjustment cap 22 can be turned in the "HIGH" direction for an increased dose or turned in the "LOW" direction for a decreased dose.

Although not necessary, it is generally desirable to provide some form of dose adjustment indicia on either the container 26 or adjustment collar 22 as described above. However, other forms of indicia may be used instead of those illustrated in FIG. 1. Further, the "HIGH" and "LOW" indicia (or other indicia) may be provided only on the container 26, and not on the adjustment collar 22. On the other hand, the indicia may instead be provided only on the adjustment collar 22 and not on the container 26.

Figure 6:
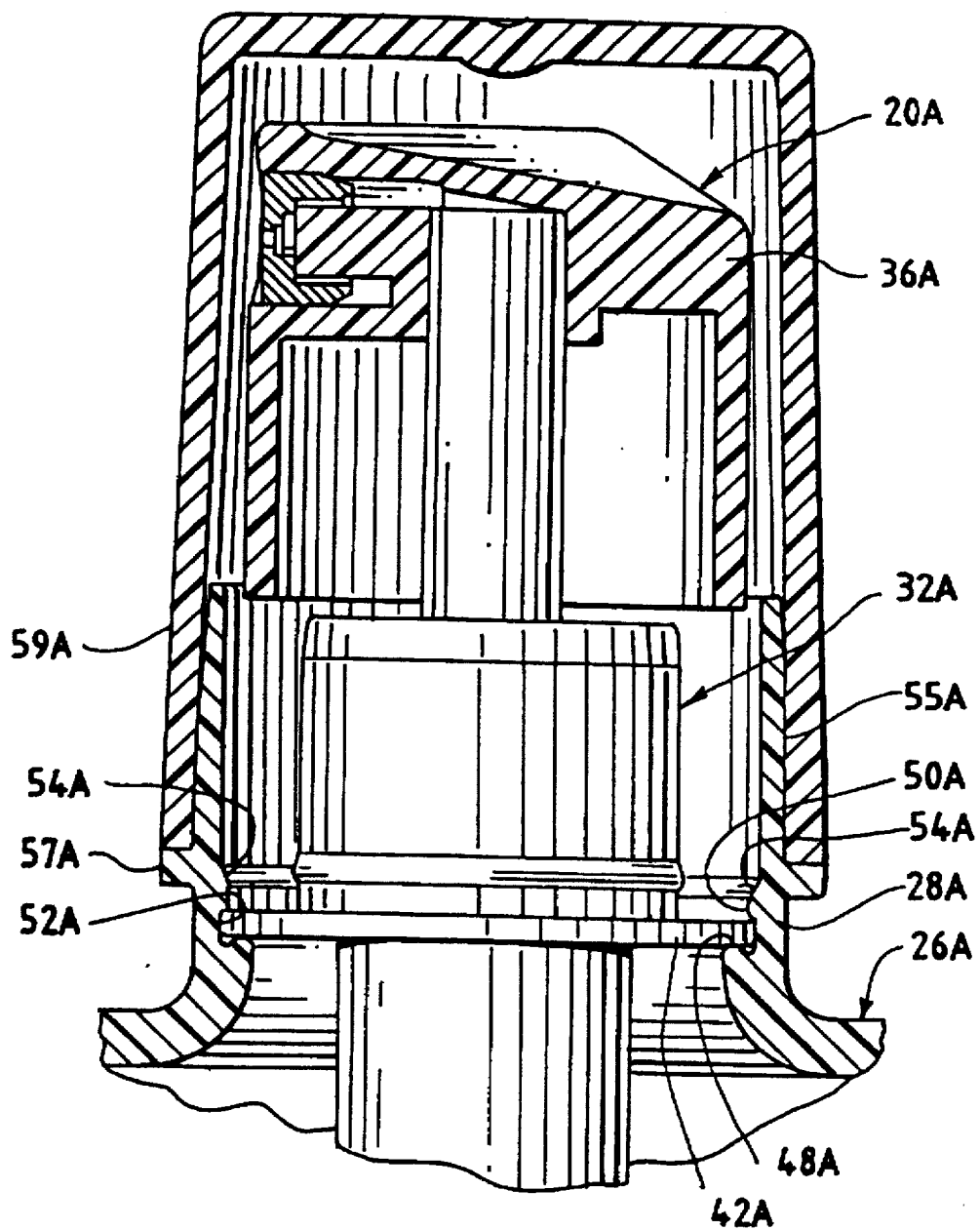
FIG. 6 is a fragmentary, cross-sectional view of a second embodiment of the system of the present invention.

A second embodiment of the system of the present invention is illustrated in FIG. 6. The system in FIG. 6 is similar, and functions in a similar manner, to the first embodiment illustrated in FIGS. 1–5. The elements of the second embodiment of the system that are identical or functionally analogous to those of the first embodiment are designated by reference numerals identical with those used for the first embodiment with the exception that the second embodiment reference numerals are followed by the upper case letter A.

In the second embodiment illustrated in FIG. 6, a pump 20A mounted in a container 26A. The container 26A has a neck 28A defining an inner support surface 48A for supporting a flange 42A of a pump body 32A. The container neck 28A defines an annular recess 52A having a cylindrical configuration for receiving the periphery of the pump body flange 42A. The container neck 28A also defines an annular snap-fit lip 50A for engaging the top edge of the pump body flange 42A.

The container neck 28A has a frustoconical lead-in surface 54A above the snap-fit lip 50A. The container neck 28A includes an annular wall 55A projecting upwardly from the frustoconical lead-in surface 54A. The wall 55A extends upwardly just past the bottom edge of the actuator button 36A when the button 36A is in the unactuated, elevated position illustrated in FIG. 6.

The second embodiment does not employ an adjustment collar like the collar 22 of the first embodiment shown in FIGS. 1–5. Instead, a flange 57A projects radially outwardly from the exterior surface of the container neck 28A. This functions as a support for a removable cover or hood 59A which can be disposed over the actuator button 36A when the pump 20A is not in use.

Figure 7:
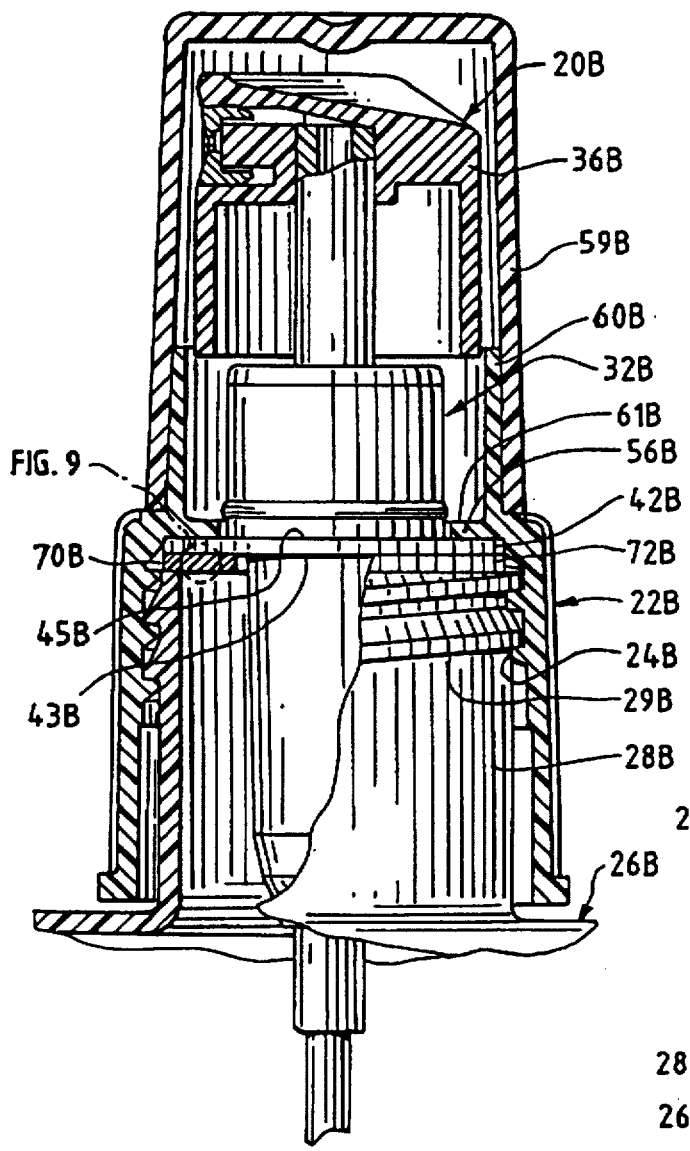
FIG. 7 is a fragmentary, cross-sectional view of a third embodiment of the system of the present invention.
Figure 9:
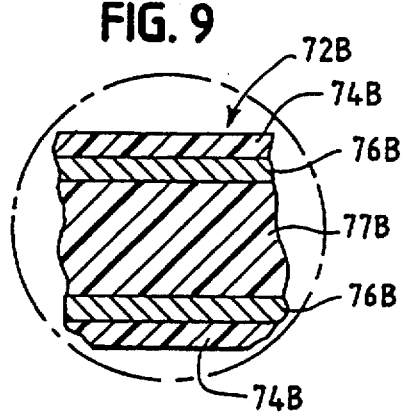
FIG. 9 is a greatly enlarged, fragmentary, cross-sectional view of the liner employed in the third embodiment illustrated in FIGS. 7 and 8.
Figure 8:
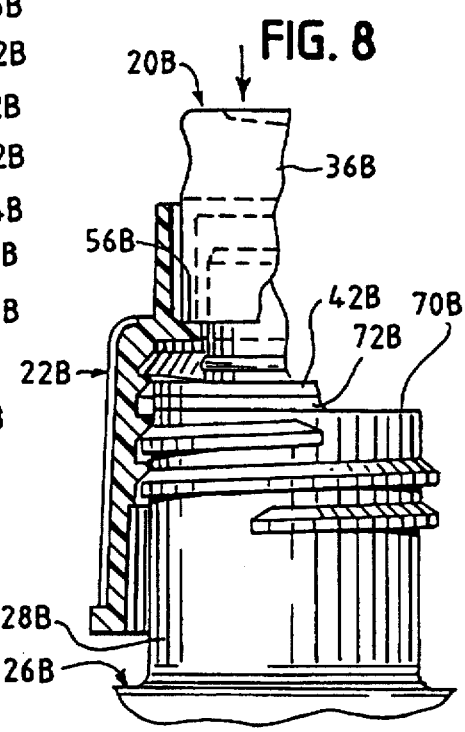
FIG. 8 is a reduced size, fragmentary, cross-sectional view similar to FIG. 7 showing the collar raised to a selected elevated position on the container and the actuator button depressed to engage the collar at the bottom of a shortened stroke length.

A third embodiment of the system of the present invention is illustrated in FIGS. 7–9. The elements of the third embodiment that are identical or function analogous to those of the first embodiment are designated by reference numerals identical with those used for the first embodiment with the exception that the third embodiment reference numerals are followed by the upper case letter B.

The third embodiment illustrated in FIGS. 7–9 includes a pump 20B mounted in a container 26B having a neck 28B which defines an opening for receiving a portion of the pump body 32B. The pump body has a flange 42B with an upper surface 45B and a lower surface 43B.

In the third embodiment illustrated in FIGS. 7–9, no snap-fit engagement between the pump 20B and container 26B is employed. Rather, the pump 20B is mounted to the top of the container 26B with a special heat weld or bond. In particular, the container neck 28B defines an upwardly (i.e., outwardly) facing, flat, annular end surface 70B for receiving a liner 72B which is disposed below the flange 42B of pump body 32B. The liner has an annular configuration and preferably lies generally in registry with the annular flange 42B of the pump body 32B.

As illustrated in FIG. 9, the preferred form of the liner 72B includes two outer layers of a heat-weldable plastic 74B which may be in the form of a plastic film. A wide variety of plastic materials may be used, including, but not limited to, low density polyethylene, ultra-low density polyethylene, ethylvinyl acetate, and the synthetic material sold under the brand name Surlyn.

At least one layer of an electrically conductive metal 76B is included in the liner 72B, and in the preferred form illustrated in FIG. 9, two layers of metal 76B are provided. Each layer of metal 76B is disposed adjacent one of the plastic film layers 74B. Each metal layer 76B may include one or more metals which are substantially electrically conductive, such as aluminum or copper, for example.

Preferably, the liner 72B includes a central carrier or middle portion 77B, and this may be cardboard, foam, the plastic material sold under the trademark Mylar, or other suitable materials.

A collar 22B is preferably provided around a pump 32B and container neck 28B. The collar 22B may be attached to the container neck 28B by suitable means. In the preferred form illustrated, the container neck 28B defines an exterior thread 29B and the closure defines a mating, interior thread 24B. Other suitable engaging means (e.g., snap-fit bead and groove structure, not illustrated) may be provided to attach the closure or collar 22B to the container 26B.

The closure or collar 22B includes a radially inwardly extending flange 56B for engaging the top surface of the pump body flange 42B. The collar flange 56B has an upwardly facing abutment surface 61B. The pump assembly can be adjusted to operate at less than full stroke length as explained hereinafter. When the pump assembly is adjusted to operate at less than full stroke length, the bottom of the pump actuator button 36B engages the collar flange abutment surface 61B when the button is depressed.

The collar 22B also includes a wall 60B which projects upwardly from the flange 56B to an elevation slightly above the bottom of the pump actuator button 36B when the actuator button is in the unactuated, fully elevated position illustrated in FIG. 7. A removable hood or cap 59B is mounted around the exterior surface of the collar wall 60B and over the pump actuator button 36B when the pump is not in use.

During the manufacture of the system illustrated in FIG. 7, the container 26B is first filled with product, and then the components are arranged to form the assembly illustrated in FIG. 7. Specifically, the pump 20B is placed in the container neck 28B with the liner 72B disposed between the container support surface 70B and the bottom surface of the pump body flange 42B. The closure 22B is then threaded onto the container neck 28B. The cap 59B is next placed on top of the collar 22B. Conventional assembly equipment may be used. The use and operation of such conventional assembly equipment forms no part of the present invention.

After the assembly of the components is completed, the assembly is passed through an induction heater which exposes the liner 72B to an alternating magnetic flux which quickly raises the temperature of the metal 76B within the liner 72B. When the metal 76B is sufficiently hot, the plastic layers 74B melt. The assembly is then removed from the induction heater or the induction heating is terminated. In any event, the assembly is allowed to cool so that the melted plastic layers 74B resolidify to form a heat weld or heat bond securely attaching the pump body flange 42B to the top of the container neck 28B.

Any suitable conventional or special induction heating system may be employed. The detailed design and operation of such an induction heating system forms no part of the present invention.

Because the pump 20B is securely attached to the top of the container neck 28B, the collar 22B can be screwed upwardly as shown in FIG. 8 so as to raise the collar flange 56B to a desired elevation. This results in a shorter pump stroke length when the pump actuator button 36B is depressed and the bottom of the button 36B hits the top surface 61B of the elevated collar flange 56B.

The use of a heat bonded liner 72B for securing the pump 20B to the container 26B results in several advantages. The liner 72B can be readily placed on, and bonded to, the top end surface 70B of the container 26. The container thus does not require a special end configuration (as is required for a snap-fit engagement of the pump or other type of mechanical engaging structure).

Further, the secure heat bonding of the pump 20B to the container 26B resists removal of the pump from the container.

Additionally, if the pump is removed or loosened, the heat bonded liner 72B will necessarily be torn or otherwise damaged. A portion of the liner 72B remaining heat-sealed to the original container 26 is an indication that a pump has been removed from the original container. A portion of the liner remaining heat-sealed to the original pump body flange 42B is an indication that the pump has been removed from its original container. Further, the portion of the liner remaining attached to the original pump will inhibit proper installation and/or leak-tight sealing of the pump in a new container.

The liner attachment system accommodates assembly of the components and placement of the assembly in the container with conventional pump placement equipment and existing assembly equipment. Further, the use of the liner attachment system eliminates the need to use a separate closure or collar to clamp the pump to the container. However, a separate collar 22B can be provided, as discussed above with respect to FIGS. 7-9, for adjusting the pump stroke length (and hence, changing the pump dose per stroke).

Figure 10:
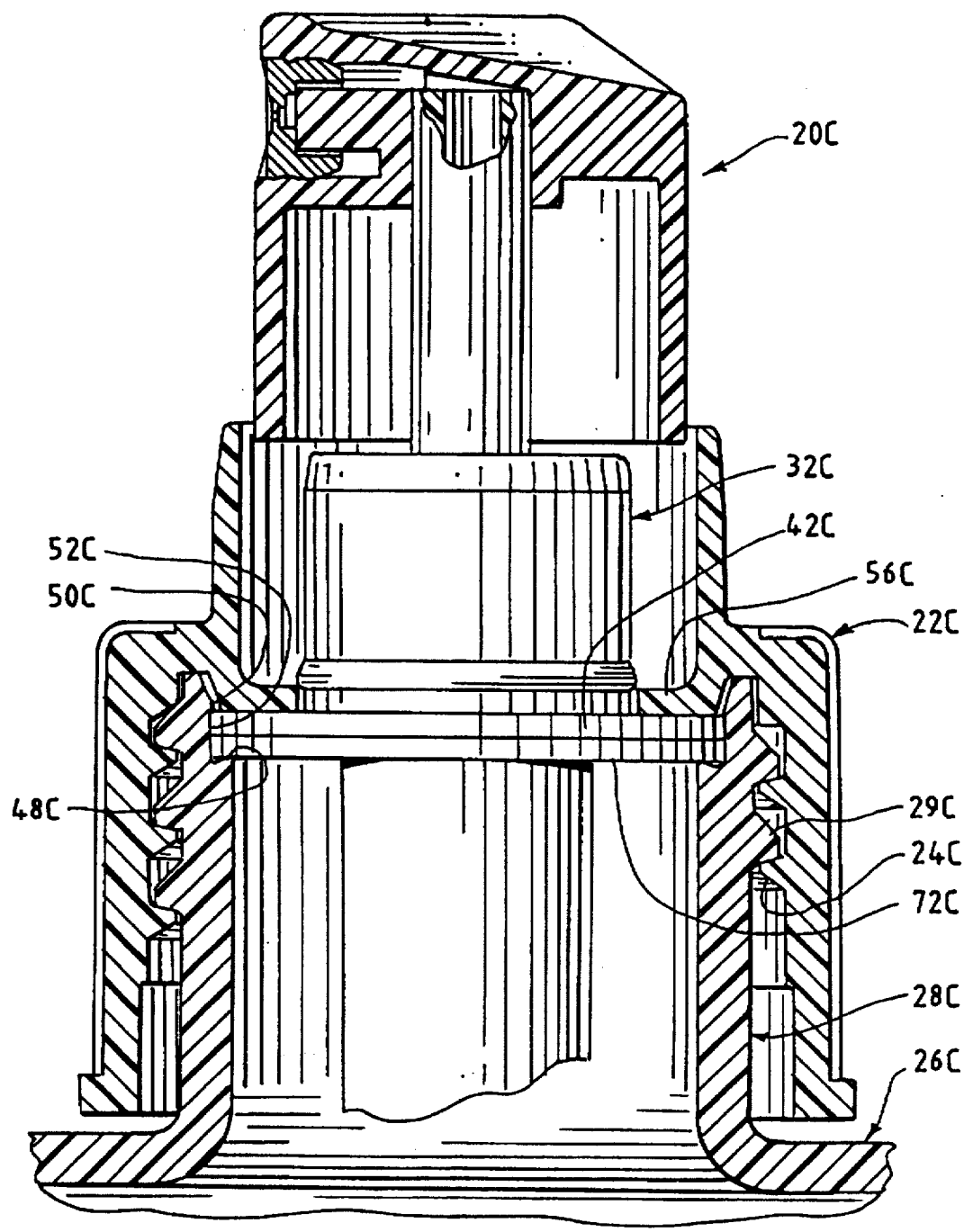
FIG. 10 is a fragmentary, cross-sectional view of a fourth embodiment of the system of the present invention.

FIG. 10 illustrates a fourth embodiment of the system of the present invention. The elements of the fourth embodiment that are identical or functionally analogous to those of the first embodiment illustrated in FIGS. 1-5 are designated by reference numerals identical with those used for the first embodiment, with the exception that the fourth embodiment reference numerals are followed by the upper case letter C.

The fourth embodiment includes a pump 20C mounted in a container 26C. The system illustrated in FIG. 10 incorporates the weldable liner 72C of the type employed in the third embodiment illustrated in FIGS. 7-8 and also incorporates a snap-fit engagement employed in the first embodiment illustrated in FIGS. 1-5.

In particular, the pump 20C include a pump body 32C having a flange 42C. A weldable liner 72C is disposed adjacent the bottom surface of the pump flange 42C. The liner 72C may have substantially the same structure and composition as the liner 72B described above with reference to the third embodiment illustrated in FIGS. 7-8.

The pump body 42C and liner 72C are mounted together in a cylindrical recess 52C of the container 26C with the lower surface of the liner 72C supported on an upwardly convex support surface or bead 48C. The liner 72C and flange 42C are retained in snap-fit engagement by means of a lip 50C projecting inwardly from the container neck 28C at the top of the cylindrical recess 52C.

The container neck 28C includes an external thread 29C for threadingly engaging an internal thread 24C of an adjustment collar 22C. The adjustment collar 22C has substantially the same structure as the collar 22 in the first embodiment illustrated in FIGS. 1-5. The collar 22C has an inwardly projecting flange 56C which can engage the top surface of the pump body flange 42C.

The collar 22C can be employed to effect assembly of the pump body 32C and liner 72C in snap-fit engagement in the container neck 28C. To this end, the adjustment collar flange 56C forces the pump collar 42C and underlying liner 72C into position in the annular recess 52C of the container neck 28C as the collar 22C is threaded down onto the container neck 28C.

Subsequently, the assembly may be passed through an induction heater to effect a weld or heat bonding of the bottom surface of the liner 72C to the container neck support surface 48C and to effect a welding or heat bonding of the top surface of the liner 72C to the bottom surface of the pump body flange 42C.

The use of a welded liner 72C in the fourth embodiment illustrated in FIG. 10 provides an even stronger attachment of the pump body 32C to the container neck 28C. In addition, if the pump body 32C is removed from the container 26C, the liner 72C will tear leaving portions of the liner on the container and portions of the liner on the pump. This will serve as evidence that the pump has been removed from the container. The torn portion of the liner 72C remaining on the pump flange 42C will inhibit convenient reuse of the pump in another container. The portion of the torn liner 72C remaining on the container neck 28C will inhibit the installation of a different pump.

The adjustment collar 22C permits the dose per pump stroke to be varied by moving the collar upwardly or downwardly as previously explained in detail with respect to the first embodiment illustrated in FIGS. 1-5 and with respect to the third embodiment illustrated in FIGS. 7-9.

Figure 11:
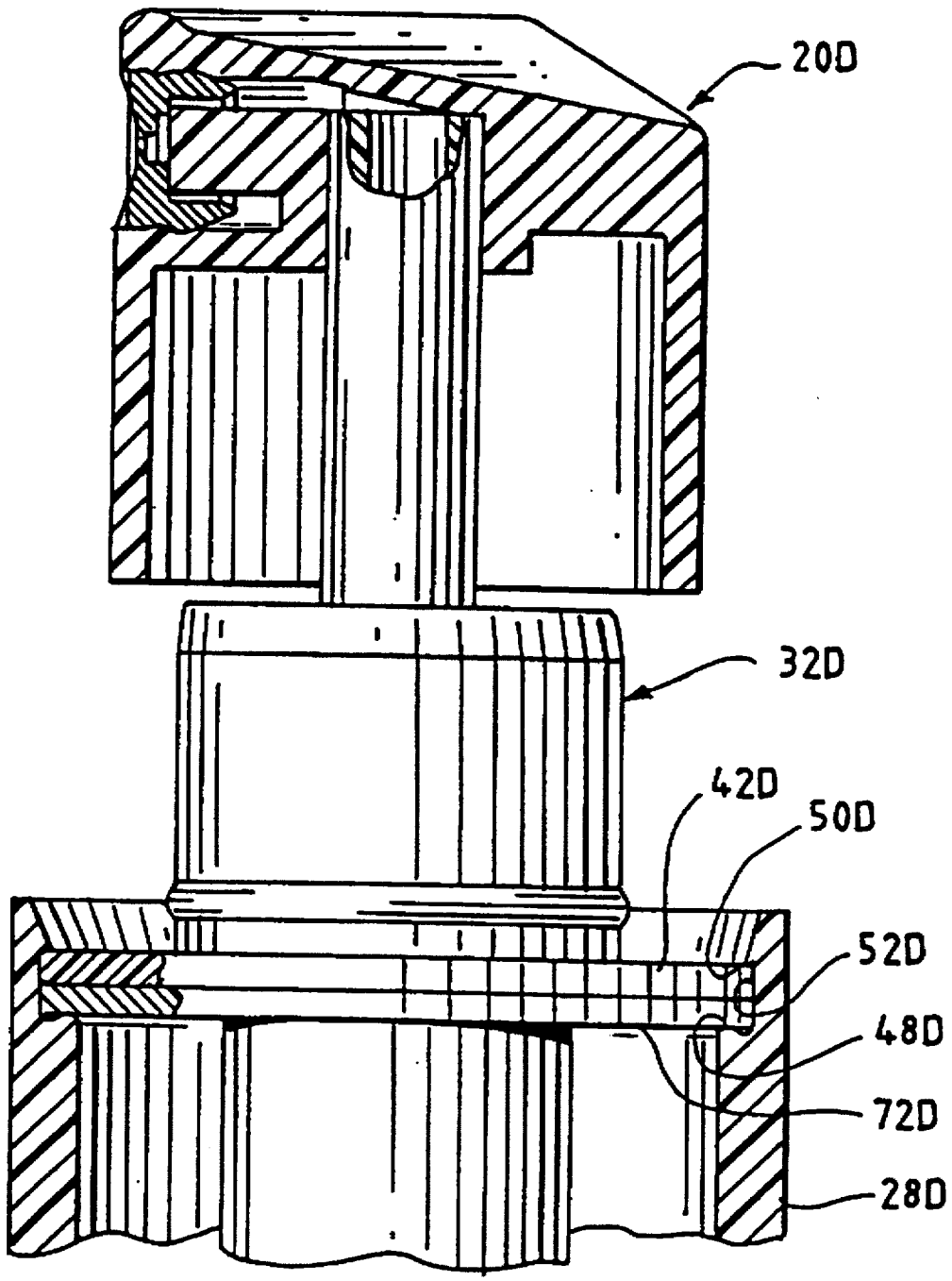
FIG. 11 is a fragmentary, cross-sectional view of a fifth embodiment of the system of the present invention.

A fifth embodiment of the system of the present invention is illustrated in FIG. 11. The fifth embodiment is similar to the fourth embodiment described above with reference to FIG. 10. The elements of the fifth embodiment that are identical or functionally analogous to those of the fourth embodiment are designated by reference numerals identical to those used for the fourth embodiment with the exception that the fifth embodiment reference numerals are followed by the upper case letter D, whereas the fourth embodiment reference numerals are followed by the upper case letter C.

The fifth embodiment includes a pump 20D having a pump body 32D mounted in the neck 28D of a container. The pump body 32D includes a flange 42D. A liner 72D is disposed adjacent the lower surface of the pump body flange 42D. The pump body flange 42D and liner 72D are received in a cylindrical recess 52D defined in the container neck 28D. The bottom surface of the liner 72D rests on an upwardly convex support surface 48D defined by the container neck 28D. The container neck 28D includes a lip 50D projecting inwardly over the top edge of the pump body flange 42D. The pump body flange 42D and liner 72D are retained within the container neck 28D in a snap-fit engagement that is substantially identical with the engagement described above for the fourth embodiment illustrated in FIG. 10.

The assembly illustrated in FIG. 11 is preferably passed through an induction heater so as to create a weld or heat bonding of the liner 72D to the container neck 28D and to the pump body flange 42D in the same manner as described above with respect to the third and fourth embodiments illustrated in FIGS. 7–10. The liner 72D provides an increase in attachment strength as well as tamper-evident capabilities described above for the fourth embodiment shown in FIG. 10.

In the fifth embodiment illustrated in FIG. 11, a dose adjustment is not provided. That is, the fifth embodiment does not have a collar such as the adjustment collar 22C provided for the fourth embodiment illustrated in FIG. 10 described above. Thus, the fifth embodiment pump stroke length is not adjustable. This eliminates the need for the additional, separate collar component. Nevertheless, owing to the snap-fit engagement between the pump body 32D and the container neck 28D, the pump 20D is securely mounted to the container. Further, although the attachment is made even stronger by the use of the welded liner 72D, the welded liner 72D has a tamper-evident function. If the pump is removed, the liner will tear and provide evidence that the pump has been removed from the container. An attempt to reuse the pump in another container will be inhibited by the portions of the torn liner remaining bonded to the bottom surface of the pump body flange 42D.

Figure 12:
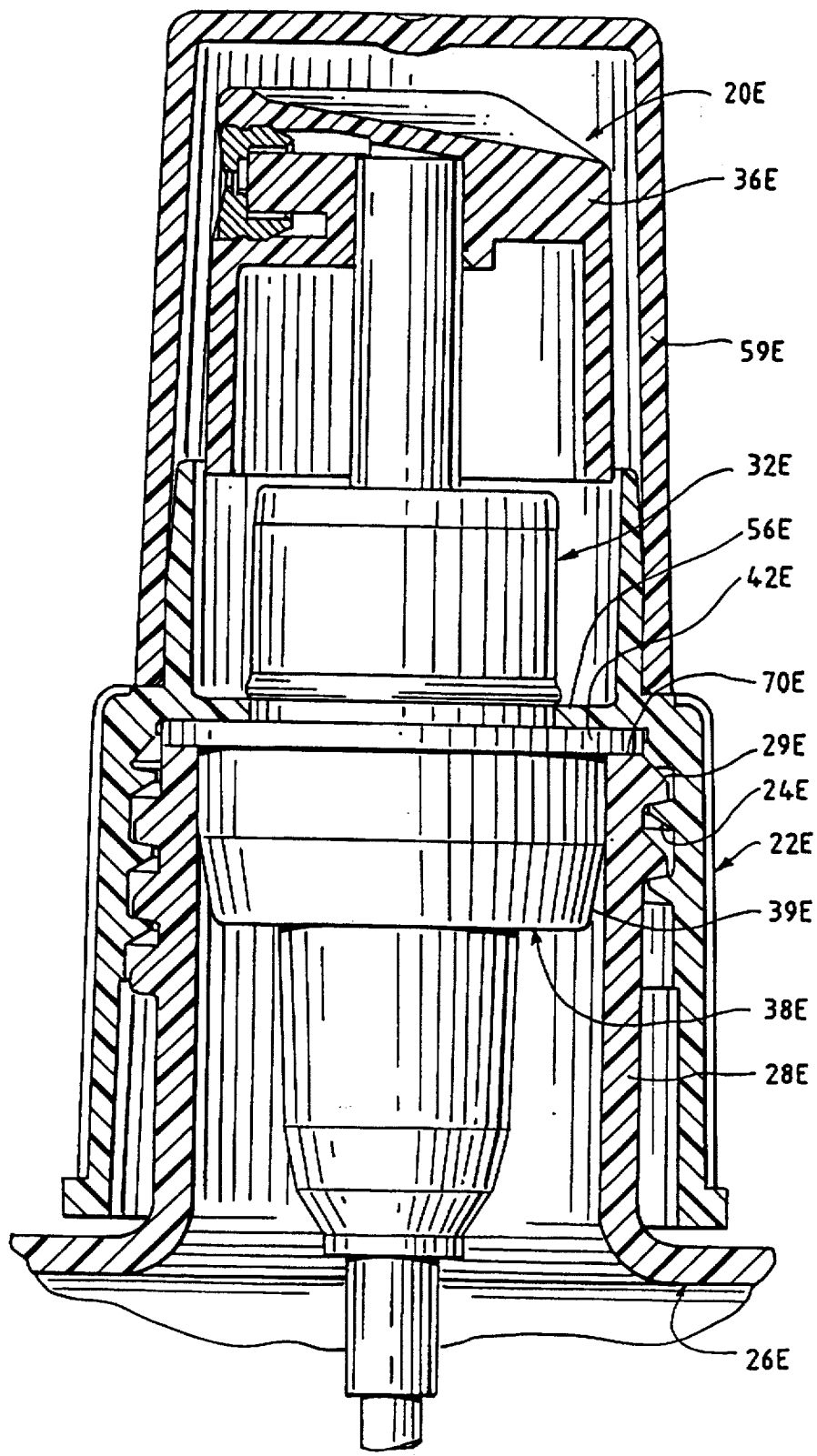
FIG. 12 is a fragmentary, cross-sectional view of a sixth embodiment of the system of the present invention.

A sixth embodiment of the system of the present invention is illustrated in FIG. 12. In many respects, the sixth embodiment is similar to the first embodiment illustrated in FIGS. 1–5. The elements of the sixth embodiment that are identical or functionally analogous to the first embodiment are designated by reference numerals identical with those used for the first embodiment with the exception that the sixth embodiment reference numerals are followed by the upper case letter capital E.

In the sixth embodiment, a pump 20E is mounted in the opening of a neck 28E of a container 26E. However, unlike in the first embodiment illustrated in FIGS. 1–5, the sixth embodiment does not employ a snap-fit engagement. Rather, the container neck 28E has a conventional opening without any special snap-fit support structure. The container neck 28E has an upwardly facing, flat, annular end surface 70E. The pump body includes a mounting flange 42E which is supported on the container support surface 70E.

The container body 32E includes an enlarged portion 38E below the flange 42E. The enlarged portion 38E has a maximum outer diameter which is slightly larger than the inside diameter of the container neck 28E. The lower part of the enlarged portion 38E defines a frustoconical lead-in surface 39E. The pump body 32E is forced in a press fit into the opening of the container neck 28E until the pump flange 42E engages the support surface 70E at the top of the container neck 28E.

A collar 22E is provided with an internal thread 24E for engaging an external thread 29E on the container neck 26E. The collar 22E and pump 20E can be initially assembled and placed together on the top of the container neck 28E. The collar 22E can be screwed down to force the pump 20E into the press-fit engagement with the container neck 28E.

A removable cover or hood 59 E may optionally be provided on the collar 22E over the pump 20E.

If desired, the collar can be screwed upwardly or downwardly to a selected height. The collar 22E includes an radially inwardly extending flange 56E for being engaged by the bottom of the pump actuator button 36E when the button is depressed. The collar 22E can be used to adjust the stroke length, and hence the dose per pump stroke, in the same manner as the collar 22 of the first embodiment described above with reference to FIGS. 1–5.

It is contemplated that most of the components of a system incorporating the present invention can be preferably fabricated from thermoplastic materials, such as polyethylene, polypropylene, and the like. However, the liner (e.g., liner 72B), of course, includes metal, and the pump internal spring or springs (not visible in the figures) would preferably be made from a suitable spring steel.

The present invention can be employed with pumps having a variety of pump heights and external configurations.

The invention can be assembled from components that are relatively easy to manufacture with high production quality. A properly designed and assembled system will exhibit consistent operating parameters unit-to-unit with high reliability.

It will be readily apparent from the foregoing detailed description of the invention and from the illustrations thereof that numerous variations and modifications may be effected without departing from the true spirit and scope of the novel concepts or principles of this invention.

What is claimed is:

1. A system for securing together a container having an opening and a finger-operable pump that has (1) a body, (2) a hollow stem extending from, and in fluid communication with the interior of, said body for reciprocation relative to said body, and (3) an actuator on, and in fluid communication with, said stem from which product can be dispensed, said system comprising:

a peripheral mounting flange extending from said pump body;

a pump support structure defined by said container around said opening for supporting said pump body flange, said support structure including a support surface against one side of said flange and a snap-fit lip engaging the other side of said flange to retain said flange in a snap-fit engagement so that said stem and actuator project from said container;

a thread defined by said container around said opening; and a collar that is rotatably mounted on said container and that defines a thread engaged with said container thread, said collar having an abutment surface facing said actuator whereby said collar can be rotated on said container to establish a selected distance between said collar abutment surface and said actuator which defines the stroke length of said pump.

2. The system in accordance with claim 1 in which said container thread is defined on the exterior of said container;

said collar has a skirt that is disposed on the exterior of said container and that defines an interior surface facing said container; and said collar thread is defined on said skirt interior surface.

3. The system in accordance with claim 1 in which said collar includes a radially inwardly extending flange defining said abutment surface.

4. The system in accordance with claim 1 in which said collar includes a radially inwardly extending flange having an engaging surface facing said pump body flange for engaging said pump body flange to force said pump body flange into snap-fit engagement in said pump support structure of said container during initial assembly of said container, pump, and collar.

5. The system in accordance with claim 1 in which said collar includes an annular wall projecting from a periphery of said abutment surface toward said actuator, said annular wall having an interior diameter large enough to accommodate reciprocation of said actuator within said annular wall.

6. The system in accordance with claim 1 in which said pump body flange is annular.

7. The system in accordance with claim 1 in which said container has a distal end defining said opening and said opening has a generally circular configuration;

said pump support structure in said container is recessed from said container distal end; and said pump support structure defines an annular recess between said support surface and said lip.

8. The system in accordance with claim 1 in which said retention means includes a welded liner bonding said pump body flange to said container support surface.

9. The system in accordance with claim 1 in which said retention means includes a press fit of said pump body in said container opening.

10. A system for securing together a container having an opening and a finger-operable pump that has (1) a body, (2) a hollow stem extending from, and in fluid communication with the interior of, said body for reciprocation relative to said body, and (3) an actuator on, and in fluid communication with, said stem from which product can be dispensed, said system comprising:

a peripheral mounting flange extending from said pump body;

a pump support structure defined by said container around said opening for supporting said pump body flange so that said stem and actuator project from said container, said support structure including a support surface;

a liner between said support surface and said pump body flange, said liner including at least two layers of heat weldable plastic around at least one interposed layer of a substantially electrically conductive metal whereby induction heating and subsequent cooling of said liner establishes a tamper-evident bonding of said pump body flange to said container support surface;

a thread defined by said container around said opening; and a collar that is rotatably mounted on said container and that defines a thread engaged with said container thread, said collar having an abutment surface facing said actuator whereby said collar can be rotated on said container to establish a selected distance between said collar abutment surface and said actuator which defines the stroke length of said pump.

11. The system in accordance with claim 10 in which said container pump support structure includes a neck comprising a wall defining said opening; and said wall has an outwardly facing, flat, annular end surface which defines said support surface.

12. The system in accordance with claim 10 in which said container pump support structure further includes a snap-fit lip that engages said pump body flange.

13. A system for securing together a container having an opening and a finger-operable pump from which product can be dispensed, said system comprising:

a peripheral mounting flange extending from said pump;

a pump support structure defined by said container around said opening for supporting said pump to project from said container, said support structure including a support surface; and a liner between said support surface and said pump flange, said liner including at least two layers of heat weldable plastic around at least one interposed layer of a substantially electrically conductive metal heated by induction and subsequently cooled to establish a bonding of said pump body flange to said container support surface.

14. The system in accordance with claim 13 in which said container pump support structure includes a neck comprising a wall defining said opening;

said wall has an outwardly facing, flat, annular end surface which defines said support surface.

15. The system in accordance with claim 13 in which said container support structure has a snap-fit lip engaging said pump flange.

16. The system in accordance with claim 13 in which said container has a distal end defining said opening;

said support surface is recessed from said container distal end; and said container has a snap-fit lip engaging said pump flange.

17. A system for securing a finger-operable pump in an opening of a container defining a support surface, said system comprising:

a peripheral mounting flange extending from said pump; and a liner including at least two layers of heat weldable plastic around at least one interposed layer of a substantially electrically conductive metal whereby said liner can be disposed between said pump flange and container support surface while induction heating and subsequent cooling of said liner bonds said pump flange to said container support surface.

18. The system in accordance with claim 17 in which said container includes a neck comprising a wall defining said opening; and said wall has an outwardly facing, flat, annular end surface which defines said support surface.

19. A system for securing together a container having an opening and a finger-operable pump, said system comprising:

said pump having (1) a body, (2) a hollow stem extending from, and in fluid communication with the interior of, said body for reciprocation relative to said body, and (3) an actuator on, and in fluid communication with, said stem from which product can be dispensed;

a peripheral mounting flange extending from said pump, said flange having a flat top surface, a flat bottom surface, and a cylindrical side surface;

a pump support structure defined by said container around said opening for supporting said pump flange, said support structure including (1) an annular recess defined by a cylindrical wall adjacent said pump flange cylindrical side surface, (2) an annular bead having an upwardly convex surface engaging and supporting said flat bottom surface of said pump flange, and (3) a snap-fit lip engaging said flat top surface of said pump flange to retain said flange in a snap-fit engagement so that said pump projects from said container;

a thread defined by said container around said container opening; and a collar that is rotatably mounted on said container and that defines a thread engaged with said container thread, said collar having an abutment surface facing said actuator whereby said collar can be rotated on said container to establish a selected distance between said collar abutment surface and said actuator which defines the stroke length of said pump.

20. The system in accordance with claim 19 in which
said container thread is defined on the exterior of said container;

said collar has a skirt that is disposed on the exterior of said container and that defines an interior surface facing said container; and said collar thread is defined on said skirt interior surface.

21. The system in accordance with claim 19 in which said collar includes a radially inwardly extending flange defining said abutment surface.

22. The system in accordance with claim 19 in which said collar includes a radially inwardly extending flange having an engaging surface facing downwardly toward said pump body flange for engaging said flat top surface of said pump body flange to force said pump body flange into snap-fit engagement in said pump support structure of said container during initial assembly of said container, pump, and collar.

23. The system in accordance with claim 19 in which said collar includes an annular wall projecting upwardly from a periphery of said abutment surface toward said actuator, said annular wall having an interior diameter large enough to accommodate reciprocation of said actuator within said annular wall.

24. A system for securing together a container having an opening and a finger-operable pump that has (1) a body, (2) a hollow stem extending from, and in fluid communication with the interior of, said body for reciprocation relative to said body, and (3) an actuator on, and in fluid communication with, said stem from which product can be dispensed, said system comprising:

a peripheral mounting flange extending from said pump body;

a pump support surface defined by said container around said opening for supporting said pump body flange;

retention means for holding said pump body flange on said support surface so that said stem and actuator project from said container;

a thread defined by said container around said opening; and a collar that is rotatably mounted on said container and that defines a thread engaged with said container thread, said collar having an abutment surface facing said actuator whereby said collar can be rotated on said container to establish a selected distance between said collar abutment surface and said actuator which defines the stroke length of said pump.

25. The system in accordance with claim 24 in which
said container thread is defined on the exterior of said container;

said collar has a skirt that is disposed on the exterior of said container and that defines an interior surface facing said container; and said collar thread is defined on said skirt interior surface.

26. The system in accordance with claim 24 in which said collar includes a radially inwardly extending flange defining said abutment surface.

27. The system in accordance with claim 24 in which said collar includes a radially inwardly extending flange having an engaging surface facing downwardly toward said pump body flange for engaging said pump body flange to force said pump body flange against said support surface defined by said container during initial assembly of said container, pump, and collar.

28. The system in accordance with claim 24 in which said collar includes an annular wall projecting from a periphery of said abutment surface toward said actuator, said annular wall having an interior diameter large enough to accommodate reciprocation of said actuator within said annular wall.

29. The system in accordance with claim 24 in which said pump body flange is annular.

30. The system in accordance with claim 24 in which said retention means includes an annular snap-fit lip defined by said container at a location spaced from said support surface and engaged with said pump body flange whereby said pump flange is retained in a snap-fit engagement in said recess.

* * * * *